Figure 1:
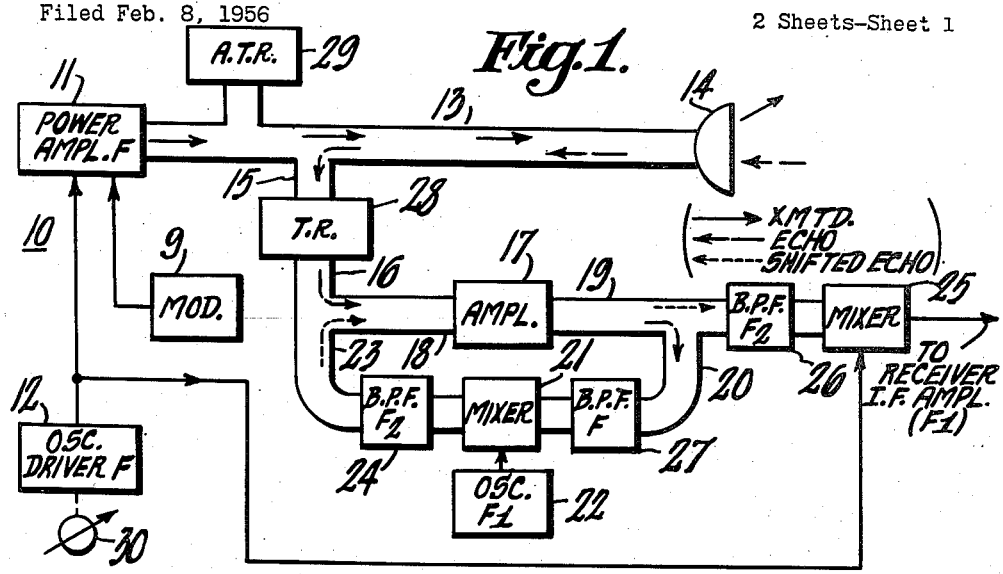

March 18, 1958     F. R. ARAMS     2,827,627
RADAR SYSTEMS

Filed Feb. 8, 1956     2 Sheets-Sheet 1

INVENTOR.
Frank R. Arams
BY
ATTORNEY

March 18, 1958  F. R. ARAMS  2,827,627
RADAR SYSTEMS
Filed Feb. 8, 1956  2 Sheets-Sheet 2

INVENTOR.
Frank R. Arams
BY
ATTORNEY

United States Patent Office 2,827,627
Patented Mar. 18, 1958

2,827,627

RADAR SYSTEMS

Frank R. Arams, Rutherford, N. J., assignor to Radio Corporation of America, a corporation of Delaware Application February 8, 1956, Serial No. 564,218

14 Claims. (Cl. 343—5)

This invention relates to radar systems and particularly to radar systems suited for tracking of movable targets or objects.

In general, radar systems include a transmitter section for generating high-power, high-frequency signals, usually in the microwave range, for reflection from remote objects and a receiver section for detecting and amplifying the weak reflection signals, for eventual visual presentation of the echo information by an oscilloscope. Radar systems now in common use employ receivers of the superheterodyne type and require complex automatic-frequency-control circuits for the receiver oscillator in order that the intermediate frequency signal shall be suitably stable. The stability problem is difficult in such systems because both the receiver and transmitter oscillators are microwave generators and it is particularly difficult when phase-coherence is required for tracking of moving targets. Another problem of prior radar systems is that of amplifying the weak reflection or echo signals to a suitably high level without at the same time producing excessively high-level noise signals visible as grass in the oscilloscope presentation.

In accordance with the present invention, the echo signal is heterodyned, as by a low-frequency oscillator and mixer arrangement, to a frequency adjacent its original frequency. The resulting frequency-shifted echo signal is heterodyned with a signal of the same frequency as the radiated signal to provide a stable intermediate frequency signal containing echo information concerning distance to the target and its movement, if any.

In one form of the invention, a low-power, high-frequency oscillator provides both the drive for a high-power amplifier which produces the high-power radiated signals and also the signal which heterodynes the frequency-shifted reflection signal to produce the intermediate-frequency echo signal. In still another form of the invention, a low-frequency oscillator which heterodynes the reflection signal to shift its frequency to an adjacent channel also drives, through a frequency-multiplier, the power amplifier providing the irradiating signal. In the latter arrangement, the frequency-multiplifier supplies the signal which heterodynes the frequency-shifted reflection signal to provide the stable intermediate frequency echo signal. In these modifications, the phase-coherence required for tracking of movable targets is achieved without complex automatic frequency control, and such coherence is maintained when, as for anti-jamming purposes, the frequency of the radiated signals is varied in accordance with a predetermined schedule or in random manner.

In still another arrangement avoiding need for complex automatic-frequency-control circuitry, the radiation signal is generated by a high-power self-excited oscillator which locks the operating frequency of a low-power oscillator supplying the heterodyning signal for beating with the frequency-shifted reflection signal to provide the stable intermediate-frequency echo signal.

More particularly, in all of these modifications the weak echo signal, before being heterodyned by the low-frequency oscillator signal, is amplified by a high-gain low-noise amplifier, preferably a traveling wave-tube, and after the amplified reflection signal is shifted by the heterodyning to an adjacent frequency, it is further amplified by the traveling wave-tube or equivalent amplifier. After such dual amplification at adjacent frequencies, the reflection signal in its frequency-shifted form is heterodyned, as above briefly stated, by a signal of the same frequency as the irradiating signal to provide the stable intermediate frequency signal containing the echo signal information.

The invention further resides in radar systems having features of combination and arrangement hereinafter described and claimed.

Figure 2:
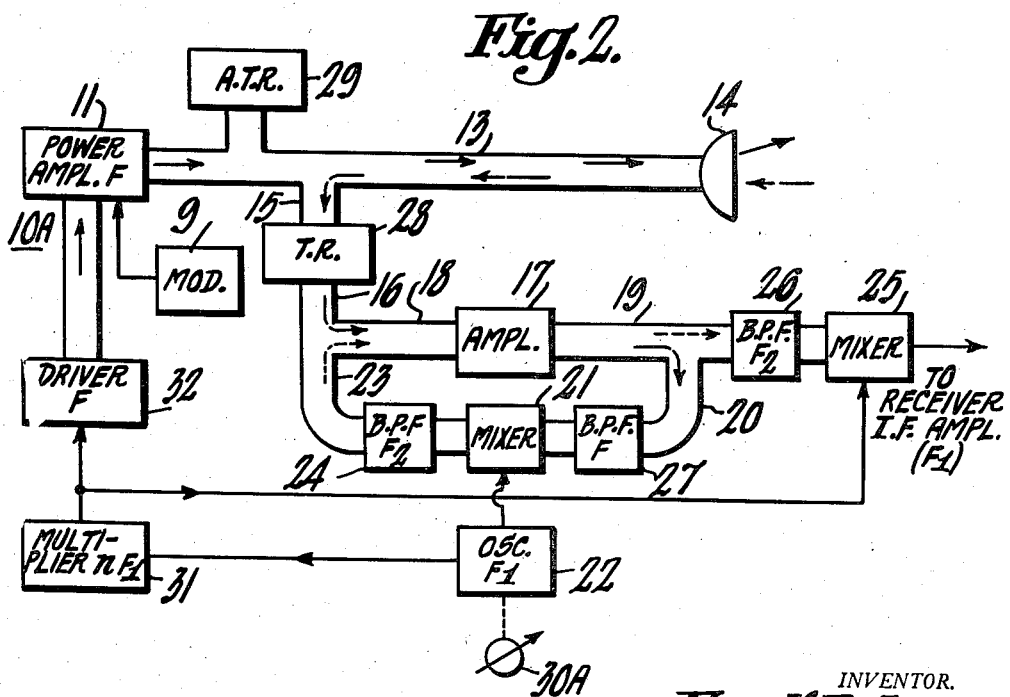
Figure 3:
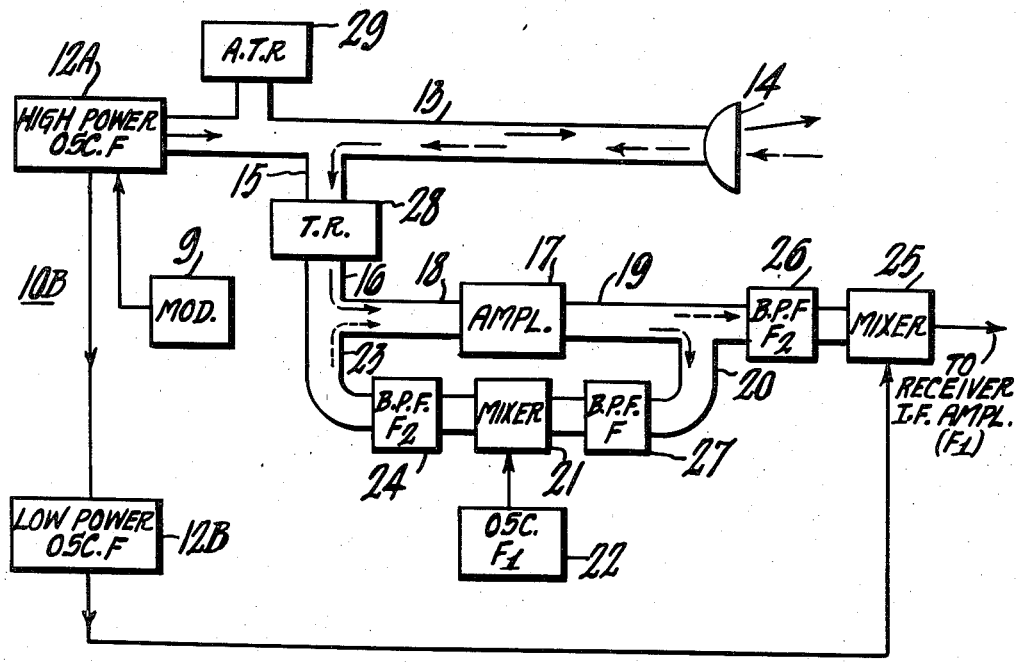

For a more detailed understanding of the invention, reference is made in the following description to the accompanying drawings in which:

Figs. 1 to 3, in block diagram form, schematically illustrate various radar systems embodying the invention.

Referring to Fig. 1, the source 10 for generating the high-power high-frequency signal radiated from antenna 14 comprises a power amplifier 11 driven from an oscillator 12. For microwave frequencies usually used by radar systems, the power amplifier tube may be a klystron or a travelling-wave amplifier tube. The oscillator tube may be a low-power klystron followed, if necessary, by a buffer driver stage not shown. The oscillator 12 operates continuously during use of the system. For pulse operation, the power amplifier 11 is periodically keyed or modulated, as by modulator 9 of conventional type, to produce a succession of relatively short pulses of microwave energy spaced at relatively long intervals. For example, the radiated pulses may be of the order of 1 microsecond duration and the period between successive pulses may be of the order of 1000 microseconds. Also by way of example and for clarity of explanation, it may also be assumed that the frequency F of the radiated signals is 3,000 megacycles.

The microwave signal produced by source 10 is fed by waveguide 13 or other suitable transmission line to the antenna 14 which radiates the signal in direction determined by the antenna orientation. The energy reflected back to the antenna from any object in the path of the radiated signal constitutes the reflection or echo signal. The received echo signal is fed from antenna 14 to input line 18 of a high-gain low-loss amplifier 17 by the transmission line 13 and associated branched coupling devices 15, 16, the latter being a suitable T-R box such as a magic tee or other hybrid junction or a directional coupler. Preferably, amplifier 17 is a traveling wave-tube since with a tube of this type a gain of 30 db or more is realizable with a noise figure of as low as 6 db. The amplified reflection signal is fed by branch 20 of the output line 19 of amplifier 17 to mixer 21 which may be a crystal diode. The mixer 21 is also fed from the low-frequency oscillator 22 operating, for example, at a frequency $F_1$ of 50 megacycles.

In consequence of heterodyning of signal F, $F_1$, the output of mixer 21 includes two microwave signals ($F+F_1$) and ($F-F_1$), each containing the information of the echo signal. The bandpass filter 24 in the output line 23 of mixer 21 selects one of these signals, for example, the higher frequency $F_2$ of 3050 megacycles. This frequency-shifted reflection signal is supplied through output line 23 to the input line 18 of amplifier 17. Thus, the reflection signal is twice amplified by amplifier 17, once at its original frequency F and again at the adjacent frequency $F_2$.

The bandpass filter 27 in the input line 20 of mixer 27 rejects frequency $F_2$, so precluding the formation of feedback loop which would otherwise result in noisy regenerative amplification of the echo signal at frequency $F_2$ or oscillation of amplifier 17 at that frequency. Filter 27, as implied above, passes the reflection signal at its original frequency F to the mixer 21 for heterodyning by oscillator 22.

The amplified frequency-shifted echo signal $F_2$ is passed to a second mixer 25 by bandpass filter 26 which rejects frequency F, the original frequency of the amplified echo signal. The second mixer 25 is also fed from oscillator 12 of the transmitter section 10 to provide a heterodyning signal having the same frequency F as the radiation signal. In consequence, the output of mixer 25 includes a low beat-frequency signal $F_1$ containing the same information as the echo signal picked up by antenna 14 but at the relatively low frequency of 50 megacycles suited for supplying to the intermediate amplifier section (not shown) of the radar receiver.

With the arrangement described, stability of the echo signal at the intermediate frequency is attained without need for an expensive microwave receiver oscillator and a complicated automatic frequency control circuit therefor. The low-frequency oscillator 22 may be an inexpensive one, using a conventional tube, stabilized by its own tuned circuit, tuned line or piezo electric crystal. It is not necessary that microwave oscillator 12 be frequency-stabilized. In fact, its operating frequency F may, to avoid jamming, be varied in accordance with a predetermined schedule, in random manner, or even after each pulse without affecting the frequency $F_1$ of the intermediate frequency signal. For anti-jamming purposes, the master oscillator 12 may, for example, be a reactance tube oscillator, or a voltage-tunable backward wave oscillator. Automatic adjustability of the operating frequency F of oscillator 12 is generically represented by the control 30.

The arrangement described also has the advantage that the traveling wave-tube amplifier 17 is twice used for amplifying the reflection signal to high level and without producing an excessive noise signal or undesired oscillations.

The TR switch tube 28 is interposed between the traveling wave amplifier 17 and transmission line 13. As in known types of radar systems, the TR tube 28 in effect short-circuits the input path to amplifier 17 during transmission of radiated signals and removes the short-circuit during the echo reception intervals. The ATR tube 29 in effect short-circuits the reflection signal path to the transmitter power amplifier 11 during reception periods and removes such short-circuit during transmission. More detailed discussion of these conventional switching and impedance matching devices of a microwave radar system is unnecessary.

The radar system shown in Fig. 2 is generally similar to that of Fig. 1 and has the advantages above discussed. The corresponding elements of both figures are identified by like reference characters so that for the most part the preceding discussion of Fig. 1 may be directly applied to Fig. 2. For brevity, further discussion of Fig. 2 is directed to respects in which it differs from Fig. 1.

In the system of Fig. 2, the source 10A for generating the high-power high-frequency signals F includes a power amplifier 11, a driver stage 32, a frequency-multiplier 31 having the required number of stages and the low-frequency oscillator 22 of the receiver section. Thus, in the system of Fig. 2, the low-frequency oscillator 22 determines both the frequency F of the radiated signal emitted from the transmitter section and the beat frequency $F_1$ supplied to mixer 21 of the receiver section for heterodyning the amplified echo signal at frequency F to an adjacent frequency $F_2$.

Since one and the same oscillator frequency $F_2$ determines both the frequency of the irradiating signal F from the transmitter and the frequency of the heterodyning signal $F_1$ of the receiver, rigid or complete phase-coherence is insured without need for complex circuitry.

Such phase-coherence is maintained even though, for anti-jamming purposes, the frequency F is varied. Such variation of frequency may be effected, as generically represented by control 30A, by varying the frequency $F_1$ of the low-frequency master oscillator 22. For such purpose, the oscillator 22 may be crystal-controlled with a voltage-controlled reactance tube for shifting the instantaneous operating frequency. The range of variation of frequency $F_1$ need not be great, because of frequency-multiplier 31, to effect a substantial change of the high-frequency F of the irradiating signal.

As in the system of Fig. 1 the traveling wave-tube amplifier 17 is used twice to amplify the echo signal, once at the frequency F and again at the adjacent frequency $F_2$ to which it is shifted by the heterodyning arrangement comprising oscillator 22 and mixer 21.

The radar system shown in Fig. 3 is also generically similar to that of Fig. 1 and possesses advantages previously discussed. Corresponding elements of Figs. 1 and 3 are identified by like reference characters so that for the most part the description of Fig. 1 is directly applicable to Fig. 3. For brevity, further discussion of Fig. 3 is directed to respects in which it differs from Fig. 1.

In the system of Fig. 3, the signals F for irradiating the remote objects are generated by a high-power self-excited microwave oscillator 12A, such as a magnetron. A continuously operating low-power microwave oscillator 12B, such as a klystron, is coupled to the high-power oscillator 12A so that it is frequency-locked thereto and so supplies to mixer 25 of the receiver section a heterodyning signal of the same frequency F as the radiated and reflected signals. Thus, as in the radar system of Figs. 1 and 2, the mixing of this heterodyning signal with the frequency-shifted reflection signal $F_2$ results in a stable intermediate frequency $F_1$ containing the desired radar information. Also, as in the systems of Figs. 1 and 2, the high-gain, low-noise amplifier 17 amplifies the echo signal first at its original frequency F and then again at an adjacent frequency $F_2$ to obtain high gain without concurrent generation of excessive noise signals or undesired oscillation.

What is claimed is:

1. A radar system comprising a transmitter for radiating signals and a receiver for receiving said signals after reflection from an object, said transmitter including a high-frequency signal source that determines the carrier frequency of said radiated signals, said receiver including a comparatively low-frequency oscillator that operates at a frequency equal to a desired intermediate-frequency, means for mixing the received reflected signal with signal from said low-frequency oscillator to obtain a received signal shifted in frequency by an amount equal to the frequency of said low-frequency oscillator, and means for mixing said frequency shifted signal with signal of said carrier frequency from said transmitter whereby there is obtained a signal of said desired intermediate frequency.

2. A radar system comprising a source for generating a high-frequency radiation signal for reflection by remote objects, a high-gain low-noise amplifier for amplifying the weak high-frequency signal reflected from said objects, means for heterodyning the amplified reflection signal to shift it to an adjacent frequency, means for applying the frequency-shifted reflection signal to said amplifier for amplification, and mixer means to which said amplified frequency-shifted reflection signal and a beating signal of the same frequency as said radiation signal are applied to produce an intermediate-frequency signal.

3. A radar system as in claim 2 in which said source of high-frequency signals comprises a low-power high-frequency oscillator and a high-power amplifier driven thereby, and in which the low-power oscillator supplies to the mixer means the signal of the same frequency as the radiation signal.

4. A radar system as in claim 2 in which the heterodyning means includes a low-frequency oscillator, in which the source for generating the high-frequency radiation signal includes a power-amplifier and driving means therefor including a frequency-multiplier for said low-frequency oscillator, and in which the frequency-multiplier supplies the beating frequency for application to said mixer means.

5. A system as in claim 2 in which the high-frequency source of radiated signals is a high-power self-excited oscillator, and in which a low-power oscillator frequency-locked to said high-power oscillator supplies the beating signal for application to the mixer means.

6. A system as in claim 2 in which the amplifier for amplifying the weak reflection signal and for amplifying the frequency-shifted reflection signal is a traveling wave-tube.

7. A system as in claim 2 in which, in avoidance of jamming, means are provided concurrently to vary the frequency of the radiated signals and of the beating signal applied to said mixer means.

8. A radar system comprising a source for generating a high-frequency radiation signal for reflection by remote objects, a high-gain low-noise amplifier for amplifying the weak high-frequency signal reflected from said objects, a source for generating a low-frequency signal, first mixer means upon which the amplified high-frequency reflection signal and said low-frequency signal are impressed to produce a frequency-shifted reflection signal, means for impressing said frequency-shifted reflection signal upon said high-gain low-noise amplifier for amplification thereby, and second mixer means upon which said amplified frequency-shifted reflection signal and a signal of the same frequency as said radiated signal are impressed to produce an intermediate-frequency signal.

9. A radar system as in claim 8 in which said source of high-frequency signals comprises a low-power high-frequency oscillator and a high-power amplifier driven thereby, and in which said low-power oscillator supplies the high-frequency signal of the same frequency as the radiated signal to said second mixer means.

10. A radar system as in claim 8 in which said source of high-frequency signals comprises a high-power amplifier and a driving means therefor including a frequency-multiplier for said low-frequency source, and in which said frequency-multiplier supplies the high-frequency signal of the same frequency as the radiated signal to said second mixer means.

11. A radar system as in claim 8 in which the high-frequency source of radiated signals is a high-power self-excited oscillator, and in which a low-power oscillator locked in frequency to said high-power oscillator supplies to said second mixer means the signal of the same frequency as the radiated signal.

12. A radar system as in claim 8 in which means are provided to vary the frequency of the radiated signals in predetermined or random manner in avoidance of jamming, and in which the concurrent variation of said high-frequency signal supplied to the second mixer means ensures constancy of the frequency of the intermediate-frequency signal.

13. A radar system as in claim 8 in which the output circuit from the amplifier to the first mixer means includes a filter which passes the amplified reflection signal at its original frequency and which rejects the amplified frequency-shifted reflection signal.

14. A radar system as in claim 8 in which the output circuit from the amplifier to the second mixer means includes a filter which passes the amplified frequency-shifted reflection signal and which rejects the amplified reflection signal at its original frequency.

No references cited.